United States Patent
Jha et al.

(10) Patent No.: US 9,934,229 B2
(45) Date of Patent: Apr. 3, 2018

(54) TELEMETRY FILE HASH AND CONFLICT DETECTION

(75) Inventors: Pradeep Jha, Redmond, WA (US); Michal Strehovsky, Redmond, WA (US); Bruce Chhay, Redmond, WA (US); Josh Carroll, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 869 days.

(21) Appl. No.: 13/279,329

(22) Filed: Oct. 23, 2011

(65) Prior Publication Data

US 2013/0103651 A1 Apr. 25, 2013

(51) Int. Cl.
*G06F 17/30* (2006.01)
*G06F 11/07* (2006.01)

(52) U.S. Cl.
CPC .... *G06F 17/30097* (2013.01); *G06F 11/0748* (2013.01); *G06F 11/0778* (2013.01)

(58) Field of Classification Search
CPC ......... G06F 17/30067; G06F 17/30091; G06F 17/30097; G06F 11/0748; G06F 11/0778
USPC ....... 707/688, 698, 736, 737, 740, 758, 687, 707/747
See application file for complete search history.

(56) References Cited

U.S. PATENT DOCUMENTS

| | | | |
|---|---|---|---|
| 6,151,708 A * | 11/2000 | Pedrizetti | G06F 8/65 717/173 |
| 7,096,493 B1 | 8/2006 | Liu | |
| 7,325,166 B2 * | 1/2008 | Maguire | 714/48 |
| 7,469,362 B2 * | 12/2008 | Hudson et al. | 714/52 |
| 7,735,065 B2 | 6/2010 | Jain et al. | |
| 7,747,582 B1 | 6/2010 | Kaminski, Jr. | |
| 8,020,149 B2 * | 9/2011 | Wolf | 714/38.1 |
| 8,140,892 B2 * | 3/2012 | Calinoiu et al. | 714/6.2 |
| 8,447,695 B2 * | 5/2013 | Chenthamarakshan | 380/278 |
| 8,561,180 B1 * | 10/2013 | Nachenberg | 726/22 |
| 8,776,028 B1 * | 7/2014 | Enakiev | G06F 11/3664 714/38.11 |
| 2004/0093491 A1 * | 5/2004 | Ebata | G06F 9/4411 713/100 |
| 2004/0128583 A1 | 7/2004 | Iulo et al. | |
| 2004/0167859 A1 * | 8/2004 | Mirabella | 705/59 |
| 2005/0033605 A1 * | 2/2005 | Bergeron et al. | 705/2 |
| 2005/0289404 A1 * | 12/2005 | Maguire | 714/57 |

(Continued)

FOREIGN PATENT DOCUMENTS

CN 1617099 A 5/2005
CN 101669118 A 3/2010

(Continued)

OTHER PUBLICATIONS

Nakhimovsky, et al., "Enabling User-Controlled Collection of Application Crash Data with DTrace", Retrieved at <<Enabling User-Controlled Collection of Application Crash Data with DTrace>>, May 2005, pp. 9.

(Continued)

*Primary Examiner* — Vincent F Boccio
(74) *Attorney, Agent, or Firm* — Workman Nydegger

(57) ABSTRACT

In one embodiment, a server may identify an executable file using a hash identifier. The server 110 may compute a hash identifier based on a file metadata set associated with an executable file. The server 110 may identify the executable file using the hash identifier.

20 Claims, 9 Drawing Sheets

(56) References Cited

U.S. PATENT DOCUMENTS

| | | | |
|---|---|---|---|
| 2006/0149806 A1 | 7/2006 | Scott et al. | |
| 2006/0173937 A1* | 8/2006 | Sia | G06F 8/71 707/999.205 |
| 2006/0235822 A1* | 10/2006 | Raghavan | G06Q 10/10 707/999.001 |
| 2006/0253837 A1* | 11/2006 | Hudson et al. | 717/124 |
| 2007/0156585 A1* | 7/2007 | Chenthamarakshan | 705/50 |
| 2008/0052677 A1* | 2/2008 | Wolf | 717/124 |
| 2008/0098042 A1 | 4/2008 | Tian et al. | |
| 2008/0098109 A1 | 4/2008 | Faihe et al. | |
| 2008/0104403 A1* | 5/2008 | Gueron | G06F 21/64 713/176 |
| 2008/0126431 A1 | 5/2008 | Walliser et al. | |
| 2008/0244531 A1* | 10/2008 | Schmelter | G06F 11/3636 717/128 |
| 2008/0254777 A1 | 10/2008 | Arneson et al. | |
| 2010/0021027 A1* | 1/2010 | Hartkens | G06F 19/363 707/E17.044 |
| 2010/0083036 A1* | 4/2010 | Calinoiu et al. | 714/5 |
| 2010/0229157 A1 | 9/2010 | Ergan et al. | |
| 2010/0242094 A1 | 9/2010 | Hussain et al. | |
| 2011/0087690 A1* | 4/2011 | Cairns | G06F 17/30097 707/769 |

FOREIGN PATENT DOCUMENTS

| | | |
|---|---|---|
| CN | 102047260 A | 5/2011 |
| EP | 1035482 A2 | 9/2000 |
| KR | 1020090116743 A | 11/2009 |

OTHER PUBLICATIONS

"About Windows Error Reporting", Retrieved at <<https://winqual.microsoft.com/help/about_windows_error_reporting_for_hardware.htm, Retrieved Date: Sep. 26, 2011, pp. 3.

"ConflictManager Reference", Retrieved at <<http://www.symantec.com/business/support/resources/sites/BUSINESS/content/live/DOCUMENTATION/1000/DOC1965/en_US/ConflictManager%208.0%20Reference_V1.0.pdf>>, 2009, pp. 1-54.

"International Search Report", dated Feb. 25, 2013, Application No. PCT/US2012/061437, Filed Date: Oct. 23, 2012, pp. 1-9.

"Search Report Issued in European Application No. 12843048.5", datd Oct. 12, 2015, 7 pages.

"First Office Action and Search Report Issued in Chinese Application No. 201280052011.3", dated Aug. 24, 2015, 13 pages.

"Second Office Action and Search Report Issued in Chinese Patent Application No. 201280052011.3", dated Apr. 7, 2016, 17 Pages.

"Third Office Action Issued in Chinese Patent Application No. 201280052011.3", dated Oct. 11, 2016, 12 Pages.

"Office Action Issued in Japanese Patent Application No. 2014-537372", dated Nov. 22, 2016, 6 pages.

Japanese Office Action issued in Japanese Patent Application No. 2014-537372 dated Jul. 11, 2017.

"Fourth Office Action and Search Report Issued in Chinese Patent Application No. 201280052011.3", dated Sep. 5, 2017, 18 pages.

"Office Action Issued in Chinese Patent Application No. 201280052011.3", dated Feb. 3, 2017, 17 pages.

* cited by examiner

| FILE NAME 310 | FILE VERSION 320 | LINK DATE 330 | CRASH DATA 340 |

*300*
Figure 3

| FILE NAME 410 | FILE VERSION 420 | LINK DATE 430 | VENDOR ID 440 | VENDOR CONTACT 450 |

*400*
Figure 4

TELEMETRY FILE HASH AND CONFLICT DETECTION

BACKGROUND

Occasionally, a computer application executing on a client device may have an error that causes the computer application to stop working, referred to as a "crash". The client device may collect a set of a data regarding the crash, described as a "crash data set". The crash data set may describe the activity of the computer at the time of the crash to provide a vendor with clues as to the cause of the crash. The crash data set may be made suitably anonymous to protect the privacy of the user. The client device may send a crash telemetry report describing the crash.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a server identifying an executable file using a hash identifier. The server may compute a hash identifier based on a file metadata set associated with an executable file. The server may identify the executable file using the hash identifier.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 3 illustrates, in a block diagram, one embodiment of a crash telemetry report.

FIG. 4 illustrates, in a block diagram, one embodiment of a vendor program report.

DETAILED DESCRIPTION

Figure 1:
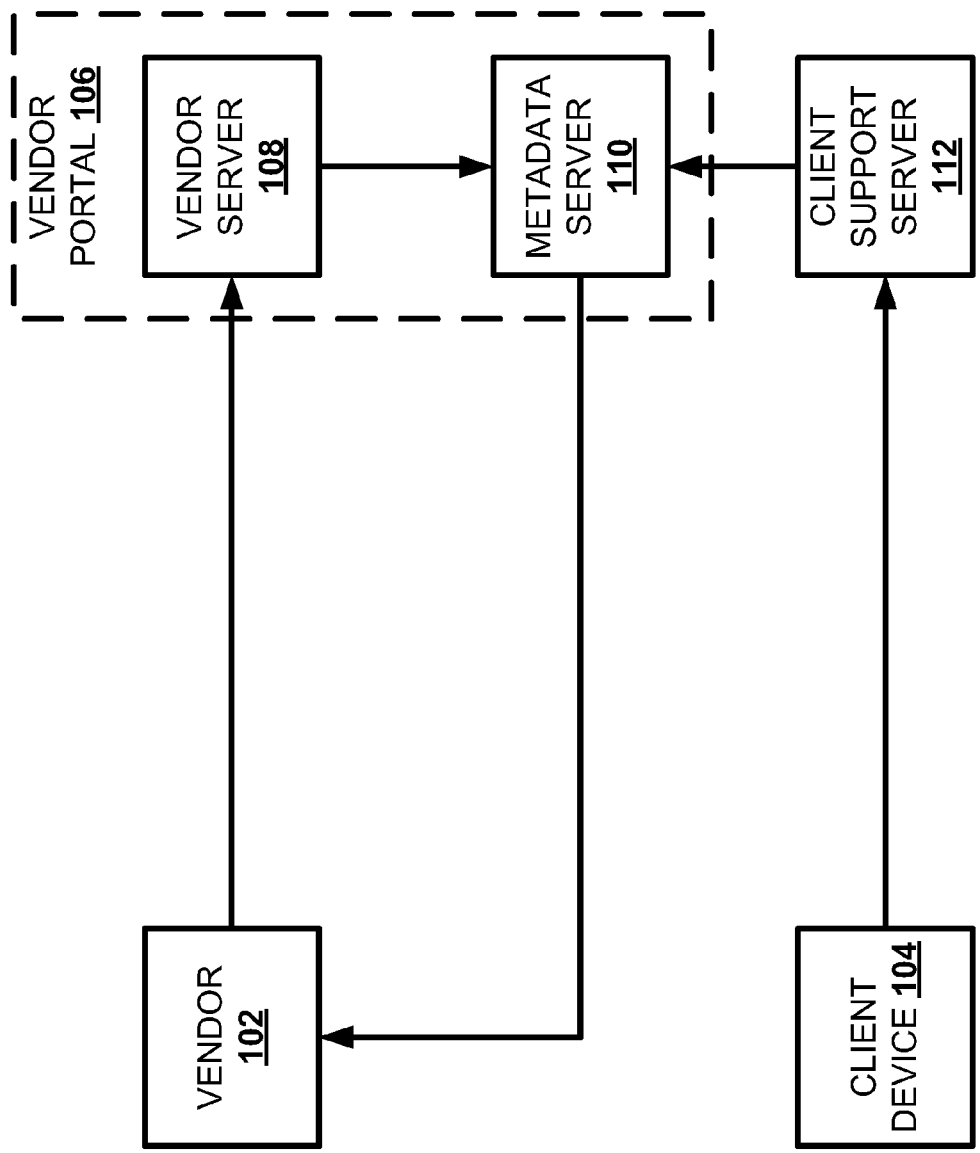
FIG. 1 illustrates, in a block diagram, one embodiment of a software crash reporting system.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a client support server.

An independent software vendor may upload a file metadata set describing an executable file to a vendor support server. A metadata server may match the file metadata set against a crash data set collected from a client device in order to determine which independent software vendor is to receive the crash dataset.

The file metadata set may contain a set of attributes that uniquely identify a single executable file. These attributes include the file name, the file version, and a file link date, in the form of a date timestamp. In database design, a single identifier may facilitate the efficient cross-link of objects. By executing a hash function on a text string of the file metadata set, a server or group of servers may produce a single identifier for an executable file. Alternately, a server may execute the hash function directly on the file metadata set.

The hash function may input the file name, file version and link date and calculate a SHA-1 hash of these values. The multiple components may hash the same values in the same way, allowing different copies of the executable file to be matched across systems even when the file information was collected differently.

Before the hash is generated, a server may pass the file metadata set through a validation phase and a transformation phase. The validation phase may check that the input parameters have the correct format and are within the specified range. If the validation fails, the server may forgo generating a hash identifier to indicate an error in input data, preventing meaningless hash identifiers from entering the system.

In the transformation phase, the server may transform the file metadata set to a format common across the system. The server may transform a file name to a consistent case, such as lower case or upper case, and adjust version information to a common format. After that, the server may generate a text string from the inputs and compute a hash from the resulting text string. Alternately, the server may compute a hash from the file metadata set without converting the file metadata set to a text string.

In addition, the hash function may simplify the process of detecting when two different independent software vendors upload information about the same file. A conflict detector may identify these conflicts when they happen, to prevent a vendor from seeing crash data about other vendors programs.

Thus, in one embodiment, a server may identify an executable file using a hash identifier. The server may compute a hash identifier based on a file metadata set associated with an executable file. The server may identify the executable file using the hash identifier.

A software crash reporting system may compare a crash data set associated with a client hash identifier to a set of vendor hash identifiers associated with one or more vendors. The client hash identifier is a hash identifier associated with data received from the client. The vendor hash identifier is a hash identifier associated with data received from the vendor. If the client hash identifier matches with a vendor hash identifier, the software crash reporting system may send the crash data set to the associated vendor. FIG. 1 illustrates, in a block diagram, a software crash reporting system 100. A vendor 102 may supply a software program to a client device 104. The vendor 102 may register a file metadata set associated with an executable file of the software program through a vendor portal 106, having a vendor support server 108 and a metadata server 110. The file metadata set is a set of data describing the executable file, such as a file name, a file version, and a link date. The file name is the name of the file as seen by the operating system of the client device 102. The file version is the version number of the executable file. The version number may encompass any full or partial updates to the software application. The link date is the date that the executable file was compiled. The vendor support server 108 may compute a vendor hash identifier based on applying a hash function to the file metadata set. The vendor hash identifier may identify the exact executable file. The vendor support server 108 may associate the vendor hash identifier with the vendor 102. The vendor support server 108 may send the vendor hash identifier and an associated vendor identifier to a metadata server 110

The client device 104 may alert a client support server 112 if the executable file crashes during execution. The client device 104 may send a crash data set to the client support server 112 describing the circumstances of the crash. The crash data set may be in a crash telemetry report. The crash telemetry report may associate the crash data set with a file metadata set for the executable file, such as the file name, file version, and the link date. The client support server 112 may compute a client hash identifier based on the file metadata set in the crash telemetry report. The client support server 112 may associate the client hash identifier with the crash data set. The client support server 112 may send the client hash identifier and associated crash data set to the metadata server 110.

The metadata server 110 may compare the client hash identifier with the stored vendor hash identifiers. The metadata server 110 may send the crash data set to the vendor 102 associated with the vendor hash identifier that matches the client hash identifier. The functions of one or more of the vendor support server 108, metadata server 110, or client support server 112 may be combined in any number of combinations or spread across multiple servers.

Figure 2:
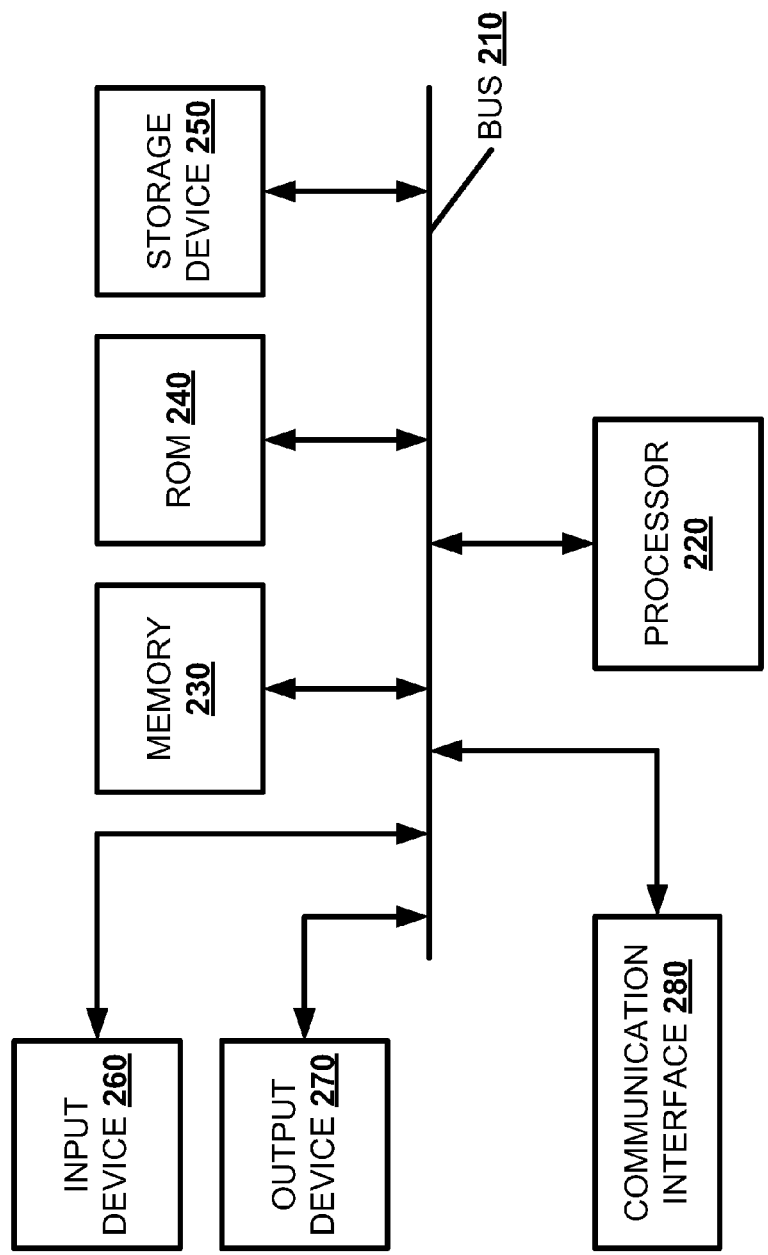
FIG. 2 illustrates, in a block diagram, one embodiment of a computing device.

FIG. 2 illustrates a block diagram of an exemplary computing device 200 which may act as a vendor support server 108, a metadata server 110, or a client support server 112. The computing device 200 may combine one or more of hardware, software, firmware, and system-on-a-chip technology to implement computation of a hash identifier. The computing device 200 may include a bus 210, a processor 220, a memory 230, a read only memory (ROM) 240, a storage device 250, an input device 260, an output device 270, and a communication interface 280. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The ROM 240 may include a conventional ROM device or another type of static storage device that stores static information and instructions for the processor 220. The storage device 250 may include any type of tangible machine-readable medium, such as, for example, magnetic or optical recording media and its corresponding drive. The storage device 250 may store a set of instructions detailing a method that when executed by one or more processors cause the one or more processors to perform the method. The storage device 250 may also be a database or a database interface for storing hash identifiers and associated data.

The input device 260 may include one or more conventional mechanisms that permit a user to input information to the computing device 200, such as a keyboard, a mouse, a voice recognition device, a microphone, a headset, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables computing device 200 to communicate with other devices or networks. The communication interface 280 may include a network interface or a mobile transceiver interface. The communication interface 280 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

FIG. 3 illustrates, in a block diagram, one embodiment of a crash telemetry report 300. The crash telemetry report 300 may list the file name 310, representing the name of the executable file. The file name 310 may be converted to a consistent case, such as lower case or upper case. The crash telemetry report 300 may list the file version 320, representing the version information stored in the binary version resource of the file. The file version 320 may be formatted as "x.y.z.w". The crash telemetry report 300 may have the link date 330, representing the executable link date and time, as specified in the "TimeDateStamp" field of the image file header of the executable. The link date 330 may be formatted to a string with an ISO8601 format of "yyyy-MM-ddTHH:mm:ss". The crash telemetry report 300 may have a crash data set 340 describing the circumstances of the crash.

FIG. 4 illustrates, in a block diagram, one embodiment of a vendor program report 400. The vendor program report 400 may list the file name 410, representing the name of the executable file. The file name 410 may be converted to a consistent case, such as lower case or upper case. The vendor program report 400 may list the file version 420, representing the version information stored in the binary version resource of the file. The file version 420 may be formatted as "x.y.z.w". The vendor program report 400 may have the link date 430, representing the executable link date and time, as specified in the "TimeDateStamp" field of the image file header of the executable. The link date 430 may be formatted to a string with an ISO8601 format of "yyyy-MM-ddTHH:mm:ss". The vendor program report 400 may have a vendor identifier (ID) 440 identifying the vendor that produced the executable file. Additionally, the vendor program report 400 may have a vendor contact 450 if the vendor has a specific routing target for any crash data.

Alternatively, a vendor portal, representing the metadata server 110, client support server 112, or vendor server 108, may store the vendor program report 400 for later access by the vendor 102. The vendor 102 may authenticate at the vendor portal and download a vendor program report 400.

Figure 5:
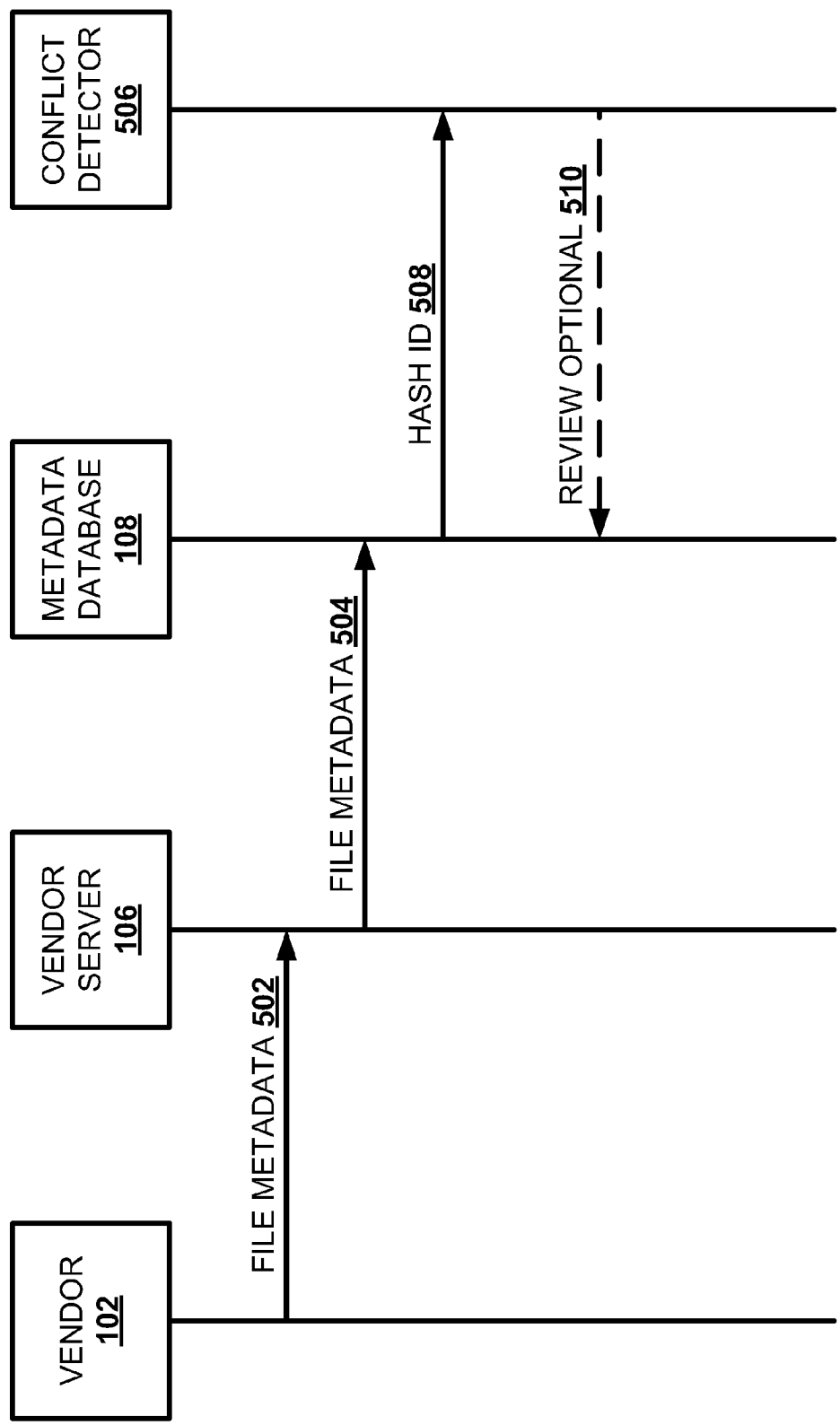
FIG. 5 illustrates, in a flow diagram, one embodiment of an initial filing of a vendor program report.

FIG. 5 illustrates, in a flow diagram, one embodiment of an initial filing 500 of a vendor program report 500. A vendor 102 may send a file metadata set to a vendor support server 108 (Action 502). The file metadata set may have a file name, a file version, and a link date. The vendor support server 108 may forward the file metadata set to a metadata server 110 (Action 504). The metadata server 110 may apply a hash algorithm to create a hash identifier. The metadata server 110 may forward the hash identifier to a conflict detector 506 (Action 508). The conflict detector 506 may be a separate server from the metadata server 110 or a subcomponent of the metadata server 110. If the conflict detector 506 determines that the hash identifier is new to the metadata server 110, the conflict detector 506 may optionally forgo requesting a review (Action 510).

Figure 6:
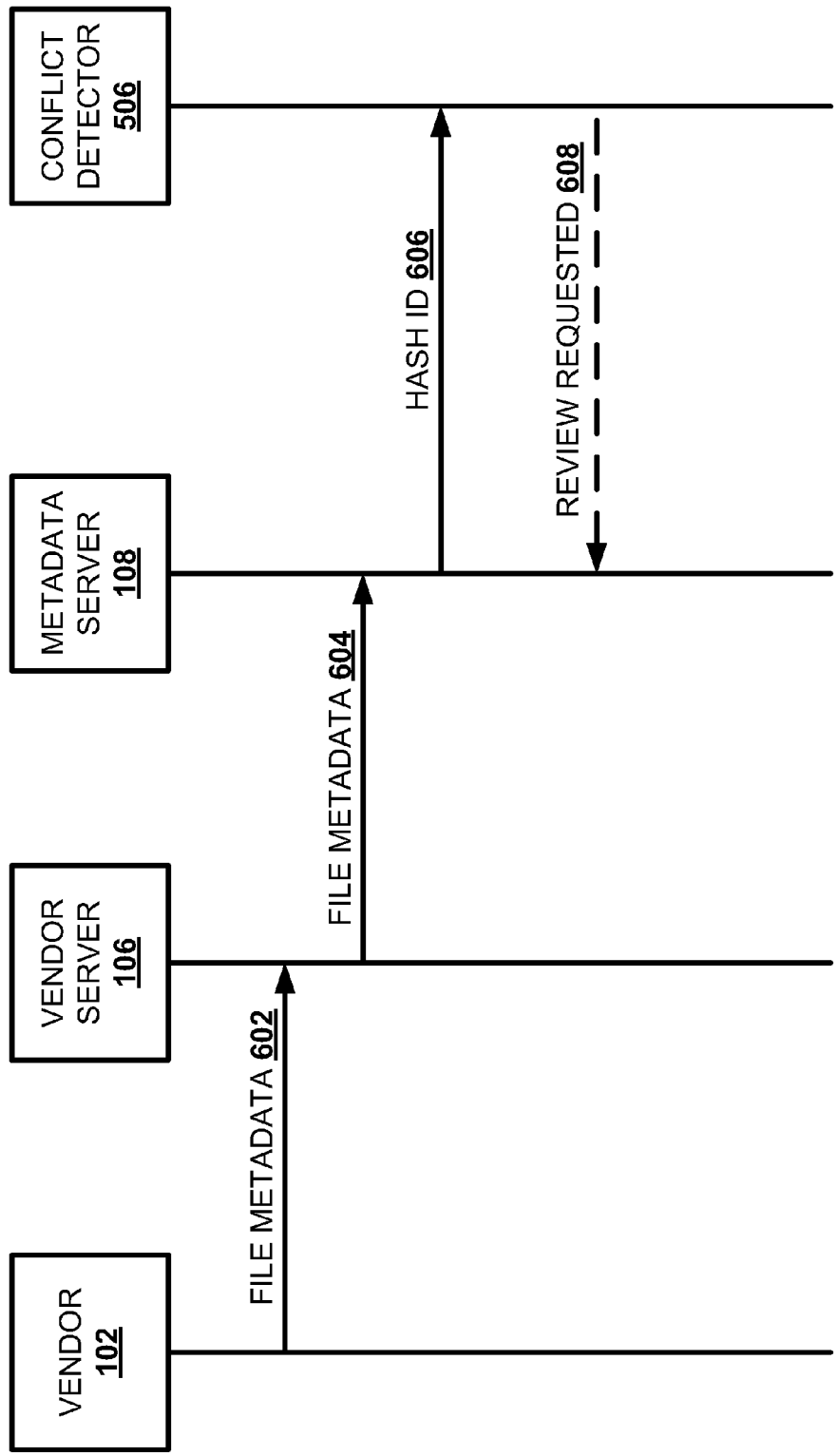
FIG. 6 illustrates, in a flow diagram, one embodiment of resolving a conflicting file report.

FIG. 6 illustrates, in a flow diagram, one embodiment of a resolution 600 of a conflicting file report. A vendor 102 may send a file metadata set to a vendor support server 108 (Action 602). The file metadata set may have a file name, a file version, and a link date. The vendor support server 108 may forward the file metadata set to a metadata server 110 (Action 604). The metadata server 110 may apply a hash algorithm to create a hash identifier. The metadata server 110 may forward the hash identifier to a conflict detector 506 (Action 606). If the conflict detector 506 determines that the hash identifier is currently in use by the metadata server 110, the conflict detector 506 may optionally request an administrator review the conflict (Action 608).

Figure 7:
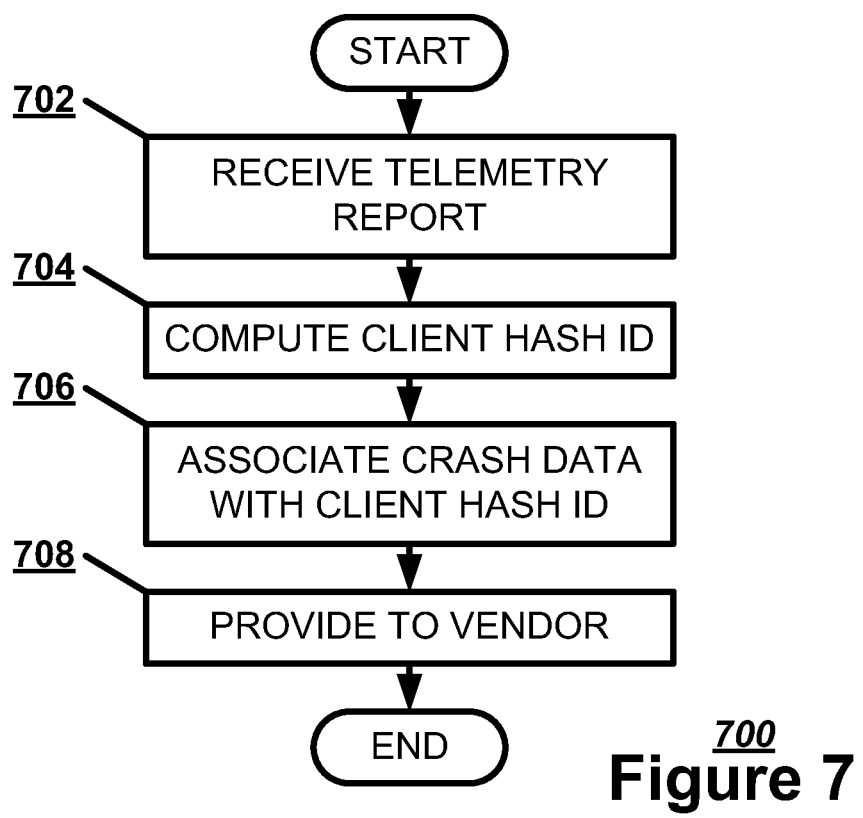
FIG. 7 illustrates, in a flowchart, one embodiment of a method of collecting crash data at a client support server.

FIG. 7 illustrates, in a flowchart, one embodiment of a method 700 of collecting crash data. While crash data collection is described as happening at a client support server 112, the vendor support server 108 and the metadata server 110 may also perform this function. The client support server 112 may receive a crash telemetry report having a file metadata set associated with an executable file and a crash data set (Block 702). The client support server 112 may compute a client hash identifier based on the file metadata set to identify the executable file (Block 704). The client support server 112 may associate the crash data set from the telemetry report with the client hash identifier (Block 706). The client support server 112 may provide the crash data set to the vendor 102 via the metadata server 110 based on the client hash identifier (Block 708). The client support server 112 may provide the crash data set 340 to a metadata server 110 to send to the vendor contact 450, or may store the crash data set 340 at the metadata server 110 for later access by the vendor 102.

Figure 8:
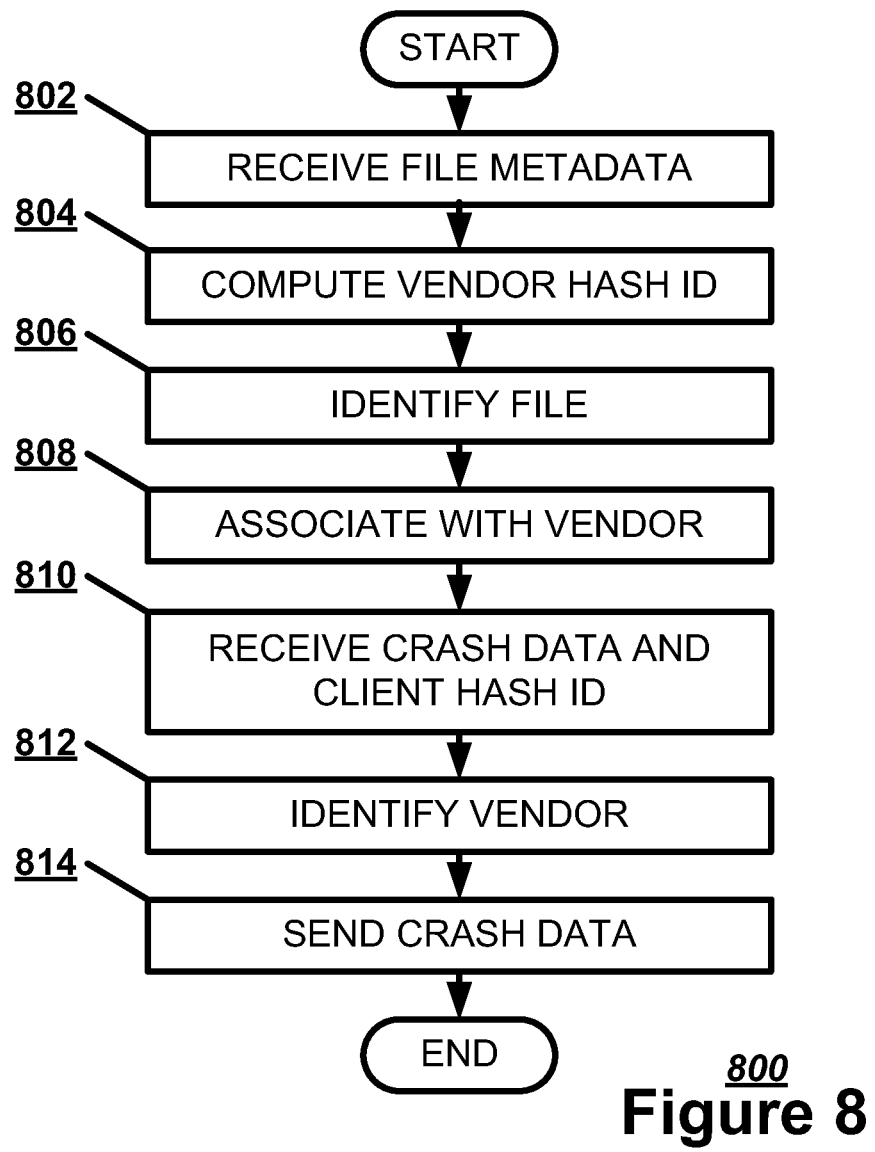
FIG. 8 illustrates, in a flowchart, one embodiment of a method of identifying an executable file from a vendor.

FIG. 8 illustrates, in a flowchart, one embodiment of a method 800 of identifying an executable file from a vendor 102. While vendor data collection is described as happening at a vendor support server 108, the metadata server 110 and the client support server 112 may also perform this function. The vendor support server 108 may receive a file metadata set associated with an executable file from a vendor 102 (Block 802). The vendor support server 108 may compute a vendor hash identifier based on the file metadata set (Block 804). The vendor support server 108 may identify the executable file using the vendor hash identifier (Block 806). The vendor support server 108 may associate the vendor hash identifier with a vendor 102 (Block 808). The vendor support server 108 may receive a client hash identifier with a crash data set from a client support server 112 (Block 810). The vendor support server 108 may identify the vendor by matching the client hash identifier to a stored vendor hash identifier (Block 812). The vendor support server 108 may provide the crash data set to the vendor 102 associated with the vendor hash identifier via the metadata server 110 (Block 814). The vendor support server 108 may have the metadata server 110 send the crash data set 340 to the vendor contact 450, or may store the crash data set 340 at the metadata server 110 for later access by the vendor 102.

Figure 9:
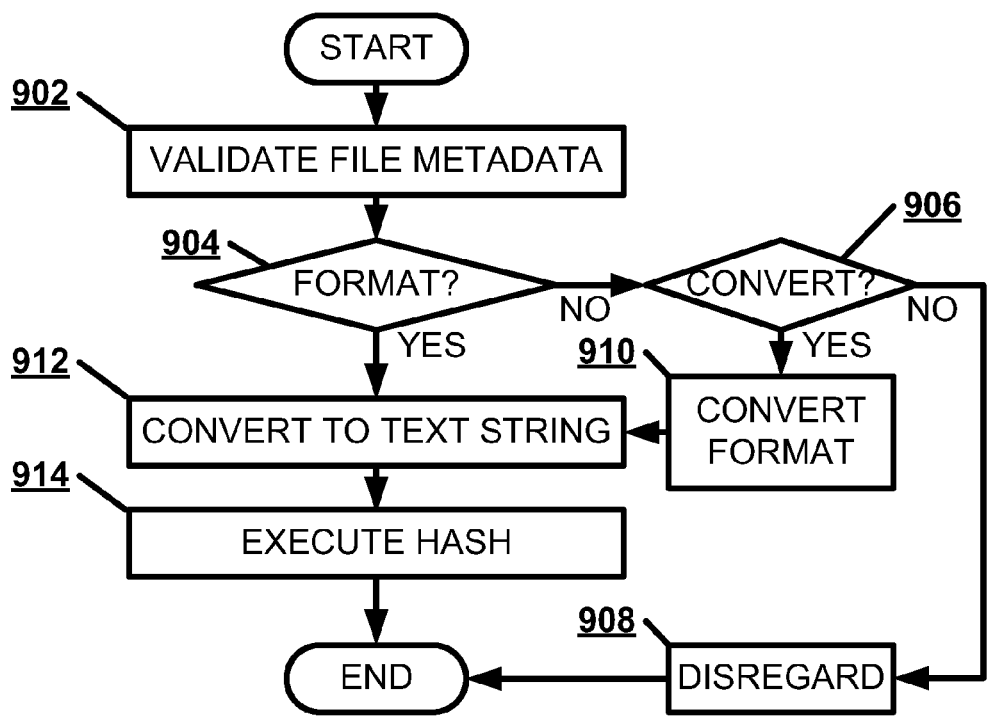
FIG. 9 illustrates, in a flowchart, one embodiment of a method of creating a hash identifier.

FIG. 9 illustrates, in a flowchart, one embodiment of a method 900 of computing a hash identifier. Any of the vendor support server 108, the metadata server 110, or the client support server 112 may compute the hash identifier. The server may validate a file metadata set to check that the file metadata is in a compatible format (Block 902). If the format is in an incompatible format (Block 904), and the file metadata set is not convertible to a compatible format (Block 906), the server may disregard the file metadata set (Block 908). If the file metadata set is convertible to a compatible format (Block 906), the server may convert the file metadata set to a compatible format (Block 910). The server may convert the file metadata set to a text string (Block 912). The server may execute a hash function on the text string to create a hash identifier (Block 914). The hash function may be at least one of a secure hash algorithm 1 (SHA-1) or a message-digest algorithm 5 (MD5). Secure hash algorithm 1 is a 160 bit cryptographic hash function, while message-digest algorithm 5 is a 128 bit cryptographic hash function.

Figure 10:
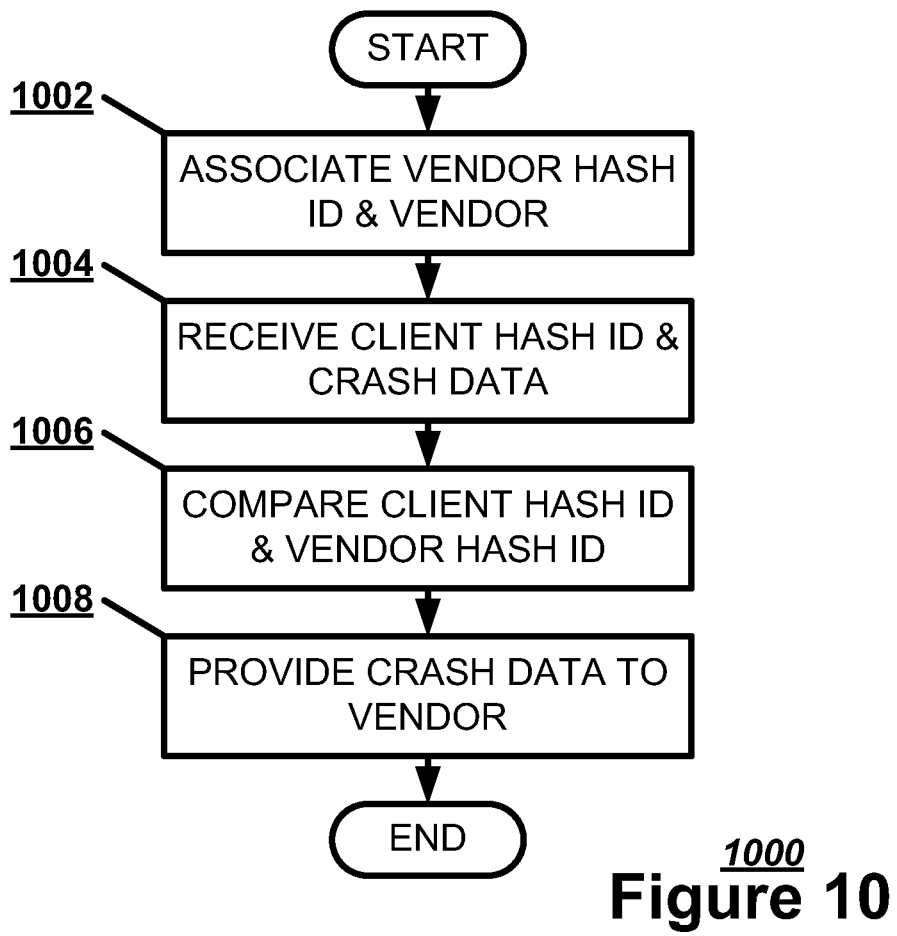
FIG. 10 illustrates, in a flowchart, one embodiment of a method of routing crash data.

FIG. 10 illustrates, in a flowchart, one embodiment of a method 1000 of routing crash data. While routing is described as happening at a metadata server 110, the vendor support server 108 and the client support server 112 may also perform this function. The metadata server 110 may associate a vendor hash identifier with a vendor 102 (Block 1002). The metadata server 110 may receive a client hash identifier with a crash data set 340 for an executable file from a client support server 112 (Block 1004). The metadata server 110 may compare the client hash identifier to stored vendor hash identifiers to identify the vendor 102 that created the executable file (Block 1006). The metadata server 110 may provide the crash data set 340 to the vendor based on the hash identifier (Block 1008). The metadata server 110 may send the crash data set 340 to the vendor contact 450, or may store the crash data set 340 for later access by the vendor 102.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A method implemented at a computer system that includes one or more processors, the method comprising:
   receiving, from a vendor, a first file metadata set corresponding to a first executable file, the first file metadata set including at least one of a file name of the first executable file, a version number of the first executable file, or a file link date associated with a compile date of the first executable file, the first file metadata set being associated with the vendor;
   in response to receiving the first file metadata set associated with the first executable file, generating a hash identifier that corresponds to the first executable file, generating the hash identifier comprising executing a hash function on the first file metadata set, including at least one of the file name, the version number, or the file link date;
   associating the generated hash identifier with the vendor;
   storing the generated hash identifier along with a plurality of other hash identifiers that were previously generated;
   receiving, from a client support server, both a crash data set corresponding to a crash of a second executable file during execution of the second executable file on a computer system and a client hash identifier that is associated with the crash data set, the client hash identifier comprising a hash identifier generated based on a second file metadata set associated with the second executable file;
   comparing the client hash identifier to the plurality of stored hash identifiers, the plurality of hash identifiers including the generated hash identifier;
   based on comparing the client hash identifier to the plurality of stored hash identifiers, identifying that the client hash identifier corresponds to the vendor, identifying that the client hash identifier corresponds to the vendor comprising determining that the generated hash identifier and the client hash identifier are the same hash identifier; and
   based on identifying that the client hash identifier corresponds to the vendor, providing the vendor with the crash data set that is associated with the client hash identifier.

2. The method of claim 1, wherein receiving the crash data set and the client hash identifier comprises receiving a crash telemetry report that includes the second file metadata set associated with the second executable file.

3. The method of claim 1, further comprising:
   converting the first file metadata set to a text string.

4. The method of claim 1, further comprising:
   validating the first file metadata set to check that the first file metadata set is in a compatible format.

5. The method of claim 1, further comprising:
   disregarding the first file metadata set if in an incompatible format.

6. The method of claim 1, further comprising:
   converting the first file metadata set to a compatible format.

7. The method of claim 1, further comprising:
   executing the hash function on a text string representing the file metadata set.

8. The method of claim 7, wherein the hash function is at least one of a secure hash algorithm 1 (SHA-1) and message-digest algorithm 5 (MD5).

9. The method of claim 1, wherein the second file metadata set includes a file name of the second executable file, a version number of the second executable file, and a file link date indicating a compile date of the second executable file.

10. A computing device, comprising:
   one or more processors; and
   one or more computer-readable media having stored thereon computer-executable instructions that are executable by the one or more processors, the method comprising, the computer-executable instructions including instructions that are executable to cause the computing system to perform at least the following:
   receive, from a vendor, a first file metadata set corresponding to a first executable file, the first file metadata set including at least one of a file name of the first executable file, a version number of the first executable file, or a file link date associated with a compile date of the first executable file, the first file metadata set being associated with the vendor;
   in response to receiving the first file metadata set associated with the first executable file, generate a hash identifier that corresponds to the first executable file, generating the hash identifier comprising executing a hash function on the first file metadata set, including at least one of the file name, the version number, or the file link date;
   associate the generated hash identifier with the vendor;
   store the generated hash identifier along with a plurality of other hash identifiers that were previously generated;
   receive, from a client support server, both a crash data set corresponding to a crash of a second executable file during execution of the second executable file on a computer system and a client hash identifier that is associated with the crash data set, the client hash identifier comprising a hash identifier generated based on a second file metadata set associated with the second executable file;

compare the client hash identifier to the plurality of stored hash identifiers, the plurality of hash identifiers including the generated hash identifier;

based on comparing the client hash identifier to the plurality of stored hash identifiers, identify that the client hash identifier corresponds to the vendor, identify that the client hash identifier corresponds to the vendor comprising determining that the generated hash identifier to and the client hash identifier are the same hash identifier; and based on identifying that the client hash identifier corresponds to the vendor, provide the vendor with the crash data set that is associated with the client hash identifier.

11. The computing device of claim 10, wherein the second file metadata set is in a crash telemetry report along with the crash data set to be forwarded to a vendor.

12. The computing device of claim 10, wherein the second file metadata set includes a file name of the second executable file, a version number of the second executable file, and a file link date indicating a compile date of the second executable file.

13. The computing device of claim 10, wherein the first file metadata set is converted to a text string.

14. The computing device of claim 10, wherein the first file metadata set is validated to check that the first file metadata set is in a compatible format.

15. A computer program product comprising one or more hardware storage devices having stored thereon computer-executable instructions that are executable by one or more processors of a computer system, the computer-executable instructions including instructions that are executable to cause the computer system to perform at least the following:

receive, from a vendor, a first file metadata set corresponding to a first executable file, the first file metadata set including at least one of a file name of the first executable file, a version number of the first executable file, or a file link date associated with a compile date of the first executable file, the first file metadata set being associated with the vendor;

in response to receiving the first file metadata set associated with the first executable file, generate a hash identifier that corresponds to the first executable file, generating the hash identifier comprising executing a hash function on the first file metadata set, including at least one of the file name, the version number, or the file link date;

associate the generated hash identifier with the vendor;

store the generated hash identifier along with a plurality of other hash identifiers that were previously generated;

receive, from a client support server, both a crash data set corresponding to a crash of a second executable file during execution of the second executable file on a computer system and a client hash identifier that is associated with the crash data set, the client hash identifier comprising a hash identifier generated based on a second file metadata set associated with the second executable file;

comparing the client hash identifier to the plurality of stored hash identifiers, the plurality of hash identifiers including the generated hash identifier;

based on comparing the client hash identifier to the plurality of stored hash identifiers, identify that the client hash identifier corresponds to the vendor, identifying that the client hash identifier corresponds to the vendor comprising determining that the generated hash identifier and the client hash identifier are the same hash identifier; and based on identifying that the client hash identifier corresponds to the vendor, provide the vendor with the crash data set that is associated with the client hash identifier.

16. The computer program product of claim 15, wherein the second file metadata set is in a crash telemetry report along with the crash data set to be forwarded to a vendor.

17. The computer program product of claim 15 wherein the second file metadata set includes a file name of the second executable file, a version number of the second executable file, and a file link date indicating a compile date of the second executable file.

18. The computer program product of claim 15, wherein the first file metadata set is converted to a text string.

19. The computer program product of claim 15, wherein the first file metadata set is validated to check that the first file metadata set is in a compatible format.

20. The computer program product of claim 15, wherein the first file metadata set is converted to a compatible format.

* * * * *